United States Patent [19]

Schade et al.

[11] 3,859,257

[45] Jan. 7, 1975

[54] METHOD FOR THE PREPARATION OF POLYESTERS OF 1,4-BUTANE DIOL

[75] Inventors: Gerhart Schade, Witten-Bommern; Hans Melin, Witten, both of Germany

[73] Assignee: Dynamit Nobel AG, Troisdorf, Germany

[22] Filed: Aug. 10, 1971

[21] Appl. No.: 170,654

[30] Foreign Application Priority Data

Sept. 17, 1970 Germany.............................. 2045914

[52] U.S. Cl............................................. 260/75 M
[51] Int. Cl.......................................... C08g 17/013
[58] Field of Search ................................. 260/75 M

[56] References Cited
UNITED STATES PATENTS

| 3,050,533 | 8/1962 | Munro et al. | 260/346.1 |
| 3,635,899 | 1/1972 | Doerr et al. | 260/75 M |
| 3,639,448 | 2/1972 | Matsuzawa et al. | 260/475 |

FOREIGN PATENTS OR APPLICATIONS 27,637   11/1968   Japan 25,573   10/1969   Japan Primary Examiner—Melvin Goldstein
Attorney, Agent, or Firm—Burgess, Dinklage & Sprung

[57]   ABSTRACT

Improvements in the production of polyesters of dicarboxylic acid moieties and 1,4-butanediol moieties, where at least some of the acid moieties are aromatic, by catalytic direct or transesterification of the acids or esters thereof with a molar excess of 1,4- butanediol, whereby reducing the amount of excess 1,4-butanediol required to produce commercially acceptable polyesters, which comprises reacting the 1,4-butanediol with the dicarboxylic acid or an ester thereof in a mole ratio of 1.05 to 1.25:1 respectively at temperatures of less than 200°C while distilling off the volatile cleavage products including the 1,4-butanediol until the flow of butanediol has been reduced to less than about 10 percent of its initial removal rate, and then polycondensing this product at temperatures above 200°C in the usual manner.

3 Claims, No Drawings

METHOD FOR THE PREPARATION OF POLYESTERS OF 1,4-BUTANE DIOL

This invention relates to the production of polyesters. It more particularly refers to an improved method of producing polyesters of 1,4 butanediol and a polycarboxylic acid component which is at least partially aromatic.

It has long been known to produce polyesters of polycarboxylic acid moieties, preferably dicarboxylic acid moieties, and 1,4-butanediol. In this regard it is known to utilize aliphatic and/or aromatic dicarboxylic acids in producing such polyesters. Such polyesters which are known which are the reaction products of aliphatic dicarboxylic acid moieties and 1,4-butanediol have not enjoyed marked commercial success because their melting or softening points have been extremely low. The known polyesters of 1,4-butanediol and aromatic dicarboxylic acid moieties or mixed aromatic and aliphatic dicarboxylic acid moieties have found utility as fusible cements and as raw materials for the preparation of coatings by the known powder coating processes. These aromatic type of polyesters have also been used in order to form therefrom rubber-elastic block polycondensates (see for example French Pat. No. 1,442,060 or U.S. Pat. No. 3,423,281). The aromatic acid moieties which have been used in these applications are exemplified by terephthalic acid and isophthalic acid moieties. These can be used alone or in admixture with such aliphatic dicarboxylic acids as adipic acid, sebacic acid, dimeric fatty acids etc.

The production of polyesters from ethylene glycol and dimethyl terephthalate is quite well known and widely commercially practiced. Most prior art attempts to produce polyesters of 1,4-butanediol have relied heavily on this polyethylene terephthalate technology in which there are a first or precondensation stage where a lower alkylester of the desired acid is transesterified with the desired glycol to produce a monomeric or lower oligomeric material, e.g. bis (hydroxyethyl) therephthalate or the 1,4-butanediol equivalent or the like. The product of this precondensation or first stage is then subjected to polycondensation in a second stage at a higher temperature in which one of the moles of attached glycol is split off and distilled overhead, and a true polyester polymer is formed.

In the prior art relating to the formation of 1,4-butanediol polyesters, it has been the practice to utilize the butanediol reactant in at least 50% molar excess in a precondensation reaction in the melt at temperatures of up to about 200°C. This product was then subjected to further temperature increase and volatilization of butanediol until a 1 : 1 mole ratio of diol to acid was realized signifying that the desired high molecular weight polyester polymer had been produced.

While this procedure resulted in high molecular weight polyester polymer product, it suffered from certain disadvantages. At the elevated temperatures used for the polycondensation, considerable quantities of 1,4-butanediol was internally condensed to tetrahydrofurane and water which were continuously produced and had to be distilled off as well the 1,4-butane diol. Thus, the distilled-off 1,4-butanediol could not be reused directly because it was contaminated with tetrahydrofurane. The working-up of the 1,4-butanediol tetrahydrofurane/water mixture by distillation is very difficult and expensive. Therefore, large quantities of 1,4-butanediol reactant were sewered rather than recovered creating an economic detriment.

It is therefore of considerable economic interest to modify the prior art method disclosed above for the preparation of polyesters containing 1,4-butanediol in such a way that the aforementioned disadvantages do not occur particularly the loss of butanediol. The obvious solution to this problem is to reduce the excess of 1,4-butanediol used. It is unfortunate that such a simple solution cannot be used because it entails the following difficulties: As is known, it is impossible, in the analogous preparation of polyethylene terephthalate, to use an amount less than approximately 1.5 moles of ethylene glycol for 1 mole of dialkylterephthalate while maintaining the usual catalyst concentrations (in the range of approximately $10^{-2}$ to $10^{-4}$ moles of catalyst/mole of ester), if the transesterification precondensation reaction is to proceed to a point where, in the subsequent polycondensation reaction, a sufficient high-molecular polyester is reproducibly obtained. If the above specified catalyst concentration is increased to a point where the quantity of the ethylene glycol used can be further reduced with a view toward a reproducible polycondensation production from the starting mixtures, industrially worthless polyesters are obtained, which contain large amounts of cross-linked portions, have poor thermal stabilities and, as a rule, show strong discolorations.

Thus it is clear that it is not practical to utilize a combination of reducing 1,4-butanediol reactant and increasing catalyst concentration as the means to improve the economics of the situation.

A method for the preparation of polytetramethylene sebacate is known in which 1 mole of dimethyl sebacate is transesterified only 1.1 mole of 1,4-butanediol. This reaction is carried out at temperatures between 172 and 215°C and with application of vacuum (C. S. Marvel, J. H. Johnson, J. Am. Chem. Soc. 72 (1950), 1674). However, in that case the catalyst concentration, being $9 \cdot 10^{-1}$ moles/mole of ester, is higher by 1 to 3 powers of ten than usual in other prior art similar transesterifications resulting, owing to the reasons given above, in extensive thermal decomposition and cross-linking of the product in polycondensation at temperatures higher than those of 215°C maximum used in that case. Temperatures of only up to about 215°C cannot be maintained in those cases where the polycondensate contains also aromatic dicarboxylic acids condensed therein, either because the melting point of the polyester to be prepared is above 215°C or due to too high a melt viscosity, so that said method can only be applied specifically to the preparation of polytetramethylene sebacate and cannot be transposed to the preparation of polyesters containing aromatic dicarboxylic acids condensed therein. Furthermore, such a low polycondensation temperature slows down the reaction speed in an economically prohibitive manner.

It is therefore an object of this invention to provide a novel method of producing polyester polymers of 1,4-butanediol and at least an aromatic polycarboxylic acid moiety.

It is another object of this invention to provide such a method which does not suffer from the disadvantages of the prior art methods.

It is a further object of this invention to provide such a method which produces a polyester polymer product which does not suffer from the discoloration and crosslinking disadvantages of the prior art.

Other and additional objects of this invention will become apparent from a consideration of this entire specification including the claims hereof.

In accord with and fulfilling these objects, one aspect of this invention resides in a technique for improving the production of polyester polymers by the two step process. The known process which is being improved upon in accord with this invention is the combination of a catalyzed precondensation reaction in which 1,4-butanediol is reacted with an aromatic polycarboxylic acid, a mixture of an aromatic and aliphatic polycarboxylic acid or a lower alkyl ester of one or both at less than about 200°C to form a 1,4-butanediol ester of such acid moiety, and a catalyzed polycondensation reaction in which the 1,4-butanediol ester is polycondensed at a temperature of at least about 250°C while taking cleaved 1,4-butanediol overhead.

According to this invention, the reactant 1,4-butanediol is fed to the precondensation in a molar proportion of 1.05 to 1.25 moles per mole of dicarboxylic acid moiety; the precondensation catalyst is provided in a proportion of $10^{-2}$ to $10^{-4}$ mole per mole of dicarboxylic acid moiety; and the precondensation stage is carried out at about 180° to 200°C, while taking volatile cleavage products and 1,4-butanediol overhead, for a time sufficient to remove substantially all of the 1,4-butanediol which will come over-head at this temperature.

The preferred reaction parameters for the process of this invention are: mole ratio of fed butanediol 1.1 to 1.2 moles per mole of acid; operating temperature of first stage 190° to 195°C; and operating temperature of second stage 250° to 310°C in vacuum.

Surprisingly the polyesters prepared by this mode of operation are of unobjectionable quality, although the concentration of 1,4-butanediol fed is reduced, as compared to the processes hitherto known, without increasing the catalyst concentration. These products are not at all or only very slightly colored. They are thermally stable and exhibit no or only a minor decrease in viscosity during prolonged heating in the melt. If, however, contrary to the method according to the invention, the pre and polycondensation stages are operated in accordance with known methods in such a way that, when using 1 to 1.25 moles of 1,4-butanediol/mole of dicarboxylic acid, the temperature of the precondensation stage is increased to above 200°C — to e.g. 220° to 240°C — before substantially all of the excess of free butanediol has been removed at least to a large extent, polycondensates are obtained in the polycondensation which are either not thermally very stable, are contaminated by decomposition products or have insufficiently high molecular weight.

During the distillation according to the invention of the volatile cleavage products and the free 1,4-butanediol contained in the precondensation reaction mixture, the free excess butanediol not bound in the form of ester is removed. Since even at temperatures below 200°C a minimum new formation of 1,4-butanediol takes place continuously due to oligomerization, it is possible to distill off further quantities 1,4-butanediol after the distilling-off of the main quantity of the excess free 1,4-butanediol. However, this lately produced 1,4-butanediol comes over at a considerably lower speed than does the butanediol distilled off as the main quantity of the excess free 1,4-butanediol. For this reason, the distillation need not be continued until no 1,4-butanediol passes over any longer, but is to be discontinued when the distillation rate of butanediol drops substantially as compared to the initial rate of distillation thereof at the same pressure and temperature conditions and amounts to about 5 to 10% of said initial rate.

As catalysts all compounds are suitable that are known from the aforementioned known fusion condensation processes for the preparation of polyethylene terephthalate and of polyesters from 1,4-butanediol and dicarboxylic acids or dicarboxylic acid esters. As examples in those cases, where only dicarboxylic acid dialkyl esters are used as acid component, are the carboxylates, hydroxides, oxides, alcoholates, glycolates or organic complex compounds of zinc, manganese, cobalt, lead, calcium, cerium, and the alkali metals insofar as these compounds are soluble in the reactions mixture. In those cases it is advantageous to render the transesterification catalysts ineffective following the completion of the precondensation reaction by means of known inhibitors, in particular phosphorus compounds such as phosphoric acid, phosphorous acid, hypophosphorous acid, phosphinic acid, phosphonic acid and the alkyl or aryl esters or salts thereof, in order to increase the thermal stability of the polyesters. For the polycondensation following the reesterification, known polycondensation catalysts are added. These known polycondensation catalysts are exemplified by those compounds which are soluble in the reaction mixture such as salts of antimony, titanium, arsenic, bismuth, tin, germanium and lanthanum.

If, however, polyesters are to be prepared using free dicarboxylic acids alone or in combination with lower alkyl esters thereof, the aforementioned reesterification catalysts do not catalyze the reaction to any appreciable extent and are therefore not to be used. In those cases the use of titanium compounds, possibly in combination with the aforementioned phosphorus compounds and/or other polycondensation catalysts, is to be preferred since titanium compounds are capable of catalyzing the precondensation reesterification or direct esterification reaction as well as the subsequent polycondensation reaction even in the presence of acid compounds. It is surprising that in the case of 1,4-butanediol polyesters the yellow-brown discoloration known to be caused by titanium catalysts in the known preparation of polyethylene terephthalate does not occur.

The following examples are illustrative of this invention and may be modified in any way desired with respect to the dicarboxylic acids or the esters thereof used and the thus modified polyesters can be adapted in this matter to their respective applications. These Examples are of course not limiting on the scope of this invention.

EXAMPLE 1

97 g of dimethyl terephthalate (0.5 mole), 49.5 g of 1,4-butanediol (0.55 mole) and 0.04 g of zinc acetate dihydrate were stirred under a pure nitrogen atmosphere at 170° to 190°C in a round-bottomed flask with a small column mounted thermometer and stirrer mounted thereon until distillate no longer passed overhead. Thereupon a vacuum up to about 5 torr was applied until even under these conditions there was substantially no further distillate passing overhead. Thereupon 0.05 g of triphenyl phosphite and 0.05 g of antimony trioxide were added, the temperature was increased to 270°C over a period of 1 hour and the pressure was lowered to 0.2 torr whin the same period. These conditions were maintained for 30 min., thereafter a sample was taken and its relative viscosity in a mixture of phenol and -1,1,2,2-tetrachloroethane (60 : 40% by wt.) was determined to be 1.82 at 25°C by means of a 1% by weight polymer solution. The virtually colorless polymer had a melting point of 220°C, which corresponded to that of the polyetramethylene terephthalate prepared by prior art techniques.

A sample of molten polycondensate was further stirred in a nitrogen atmostphere at normal pressure and a temperature of 270°C; after 2 hours the relative viscosity had dropped to 1.79 and after 4 hours to 1.50. This is proof of a good thermal stability of the melt.

EXAMPLE 2

Example 1 was repeated with the only difference being that the reesterification temperature was increased to 230°C without application of a vacuum following the slowing-down of the methanol cleavage. Thereupon the triphenyl phosphite as well as the antimony trioxide were added and the vacuum was applied. Yellow-brown discolored products were obtained having a maximum relative viscosity of only 1.5 to 1.7. These maximum relative viscosities dropped again markedly after only 5 to 15 min. under polycondensation conditions, and the polyesters produced were occasionally thermally degraded in that they contained dark-colored particles which consisted mainly of polybutadiene — as was evident from the fact that they could not be saponified and were olefinically unsaturated.

EXAMPLE 3

67.9 g of dimethyl terephthalate (0.35 mole), 24.9 g of isophthalic acid (0.15 mole), 49.5 g of 1,4-butanediol (0.55 mole) and 0.056 g of tetrabutyl titanate were stirred at 180° to 195°C for 2½ hours, during which time 30 ml of distillate were produced. Thereafter virtually nothing passed overhead any more. The temperature of 180° to 195°C was maintained for 20 mins. under vacuum of up to 5 torr, subsequently 0.056 g triphenyl phosphite were added, the temperature was increased to 270°C within 30 min. and simultaneously the pressure decreased to 0.2 torr. After 30 min., at the above specified final conditions, a relative viscosity of 1.85 was reached; a clearly visible drop of the viscosity occurred only after stirring the melt for 3 hours at 270°C under nitrogen at normal pressure.

EXAMPLE 4

Example 3 was repeated with the only difference being that, in lieu of isophthalic acid, 0.15 mole each of sebacic acid, azelaic acid or adipic acid were used. In all cases high-molecular weight polyesters were obtained having a thermal stability similar to the product according to Example 3.

EXAMPLE 5

Into a 40 liter autoclave with stirrer and equipped with an effective heatable packed column, 9.7 kg dimethyl terephthalate (50 moles), 3.32 kg isophthalic acid (20 moles), 6.66 kd 1,4-butanediol (74 moles) and 6 g tetraisopropyl titanate were fed. After displacing the air in the autoclave with nitrogen, the contents were heated and maintained at 180° to 195°C. After 3.6 kg distillate had been produced (corresponding to 92% of theory) and the distillation rate had markedly slowed down (approx. 3 hours after the beginning of the distillation), a direct connection was established between autoclave with stirrer and collecting vessel (condenser) by-passing the column, and a vacuum, low at first, was applied, which reached 5 torr in one-half hour. Thereupon 8 g of triphenyl phosphite were introducted, the temperature increased to 260°C and simultaneously the pressure lowered to 0.2 torr. After reaching these final conditions, stirring was continued for another 1½ hours. The highly viscous polycondensate was removed from the autoclave by extrusion thereof through a bottom valve by means of nitrogen pressure and granulated. The discharge time was approximately 40 minutes; the polyester retained its relative viscosity of 1.8 unchanged during this discharge time.

When this Example was modified in such a way that, following the slowing down of the distillation rate at 180° to 195°C, the inside temperature was increased to 230°C within 40 minutes and only then a vacuum was applied, only low-molecular, yellow-brown discolored products containing black inhomogeneities are obtained.

What is claimed is:

1. A process for producing a polyester polymer from 1,4-butanediol and a polycarboxylic acid component which is a mixture of an aromatic dicarboxylic acid or an aliphatic dicarboxylic acid and a lower alkyl ester of an aromatic dicarboxylic acid or a lower alkyl ester of an aliphatic dicarboxylic acid wherein said polycarboxylic acid is at least partly aromatic which comprises the steps of:
    a. In a first stage subjecting a mixture of 1,4-butanediol and a mixture of an aromatic dicarboxylic acid or an aliphatic dicarboxylic acid and a lower alkyl ester of an aromatic dicarboxylic acid or a lower alkyl ester of an aliphatic dicarboxylic acid to a catalytic precondensation conducted at a temperature between 180° and 200°C while removing cleavage products by distillation in the presence of an organotitanate polycondensation catalyst in a proportion of about $10^{-2}$ to $10^{-4}$ mole per mole of dicarboxylic acid moiety while distilling 1,4-butanediol and cleavage products overhead for a sufficient time to reduce the flow of 1,4-butanediol overhead to up to about 10% of its initial distillation flow rate, the molar ratio of butanediol to the mixture of dicarboxylic acid and dicarboxylic ester being 1.05–1.25:1; and
    b. In a subsequent stage, subjecting the product from the precondensation stage to a polycondensation at a higher temperature than the temperature employed in the precondensation stage in the presence of a polycondensation catalyst, said polycondensation being carried out at a temperature between about 250° and 310°C in a vacuum.

2. An improved method as claimed in claim 1 wherein said precondensation stage is operated at about 190° to 195°C.

3. An improved process as claimed in claim 1 including carrying out said precondensation in an increasing vacuum environment and carrying out said polycondensation in a vacuum.

* * * * *